United States Patent
Yuan et al.

(10) Patent No.: US 10,108,513 B2
(45) Date of Patent: Oct. 23, 2018

(54) TRANSFERRING FAILURE SAMPLES USING CONDITIONAL MODELS FOR MACHINE CONDITION MONITORING

(71) Applicant: Siemens Aktiengesellschaft, Munich (DE)

(72) Inventors: Chao Yuan, Plainsboro, NJ (US); Amit Chakraborty, East Windsor, NJ (US); Holger Hackstein, Dietzenbach (DE); Hans Weber, Dieburg (DE)

(73) Assignee: Siemens Aktiengesellschaft, Munich (DE)

( * ) Notice: Subject to any disclaimer, the term of this patent is extended or adjusted under 35 U.S.C. 154(b) by 178 days.

(21) Appl. No.: 15/303,243

(22) PCT Filed: Apr. 16, 2014

(86) PCT No.: PCT/US2014/034305
§ 371 (c)(1),
(2) Date: Oct. 11, 2016

(87) PCT Pub. No.: WO2015/160339
PCT Pub. Date: Oct. 22, 2015

(65) Prior Publication Data
US 2017/0031792 A1    Feb. 2, 2017

(51) Int. Cl.
*G06F 11/00* (2006.01)
*G06F 11/22* (2006.01)
(Continued)

(52) U.S. Cl.
CPC ...... *G06F 11/2257* (2013.01); *G05B 23/0224* (2013.01); *G06N 99/005* (2013.01)

(58) Field of Classification Search
CPC .................................. G06F 11/2257
(Continued)

(56) References Cited

U.S. PATENT DOCUMENTS 5,119,468 A * 6/1992 Owens ................. G05B 13/027
                                                700/31
5,465,321 A * 11/1995 Smyth ................. G06F 11/2257
                                                376/216
(Continued)

FOREIGN PATENT DOCUMENTS

EP        1630634 A2    3/2006
WO    20140012579 A1    1/2014

OTHER PUBLICATIONS

International Search Report dated Jan. 27, 2015; Application No. PCT/US2014/034305; Filing Date: Apr. 16, 2014; 9-pages.

*Primary Examiner* — Dieu-Minh Le

(57) ABSTRACT

A method for predicting failure modes in a machine includes learning (31) a multivariate Gaussian distribution for each of a source machine and a target machine from data samples from one or more independent sensors of the source machine and the target machine, learning (32) a multivariate Gaussian conditional distribution for each of the source machine and the target machine from data samples from one or more dependent sensors of the source machine and the target machine using the multivariate Gaussian distribution for the independent sensors, transforming (33) data samples for the independent sensors from the source machine to the target machine using the multivariate Gaussian distributions for the source machine and the target machine, and transforming (34) data samples for the dependent sensors from the source machine to the target machine using the transformed independent sensor data samples and the conditional Gaussian distributions for the source machine and the target machine.

18 Claims, 4 Drawing Sheets

(51) Int. Cl.
*G05B 23/02* (2006.01)
*G06N 99/00* (2010.01)

(58) Field of Classification Search
USPC .......................... 714/47.3, 47.1, 47.2, 26, 1
See application file for complete search history.

(56) References Cited

U.S. PATENT DOCUMENTS

| | | | | |
|---|---|---|---|---|
| 6,415,276 | B1* | 7/2002 | Heger | G05B 9/02 |
| | | | | 702/183 |
| 7,788,205 | B2* | 8/2010 | Chalasani | G06Q 10/04 |
| | | | | 706/48 |
| 8,103,463 | B2* | 1/2012 | Kalgren | G01D 3/08 |
| | | | | 702/117 |
| 2005/0055609 | A1 | 3/2005 | Yuan et al. | |
| 2018/0001184 | A1* | 1/2018 | Tran | H04N 5/2257 |

\* cited by examiner

TRANSFERRING FAILURE SAMPLES USING CONDITIONAL MODELS FOR MACHINE CONDITION MONITORING

BACKGROUND

Technical Field

Embodiments of the present disclosure are directed to methods and systems for fault diagnosis for machine condition monitoring.

Discussion of the Related Art

Data-driven methods have received increasing attention in fault diagnosis of machine condition monitoring in recent years. In contrast to rule-based expert systems, data-driven approaches do not need extensive knowledge of a machine, making it easy to apply the same principles to different applications with little adaptation. In addition, data-driven algorithms that can adopt state-of-the-art techniques in pattern recognition or supervised machine learning tend to have greater generalization capability with respect to future test samples.

However, one challenge with regard to data driven approaches is the poor availability of training samples, specifically the failure training samples. In the life span of a typical machine, such as a gas turbine or an airplane, the machine should, most of the time, be in a normal, healthy, state. Only in a rare case can it experience some type of failure. Therefore, obtaining normal training data is not an issue, but acquiring failure samples is challenging. Even if at least one failure sample per failure type can be obtained, these samples are very likely to come from different machines.

FIG. 1 illustrates this need for properly transferring failure samples. Machine 1, the source, has both normal training samples 11 and failure training samples 12 in FIG. 1(a). Machine 2, a target, only has normal training data 13 in FIG. 1(b). How can failure training data from machine 1 be used to help train a pattern recognition algorithm for machine 2? Copying the failure data as is by overlaying the data, as shown in FIG. 1(c), will not work because machine 1 and machine 2 may have quite different operating behaviors and a failure on machine 2 may look different from the same failure occurring on machine 1. As a consequence, the copied failure samples mistakenly overlap with the normal training samples, as shown in FIG. 1(c).

Transfer learning is an active research field in machine learning and may be used to address these sample transferring challenges. There are generally two approaches applicable to this situation.

A. Re-weighting failure samples: This approach assigns a larger weight to training samples in the target domain (machine 2) and smaller weights to training samples in the source domain (machine 1). Alternatively it assigns a larger weight to source domain training samples that are closer to the data distribution of the target domain. However, it requires an assumption: the behavior of machine 1 must be similar to behavior of machine 2. This assumption is often not true in machine condition monitoring, as shown for example, in FIG. 1(c).

B. Applying a transformation to failure samples: The failure samples in the source domain are mapped to the target domain through a linear or a nonlinear transformation. One challenge is how to constrain this mapping because there are so many options. Correspondence is one of such constraints. For example, it may be assumed that certain samples from the source domain should be closer to certain samples from the target domain after the transformation. This type of correspondence is usually not available between machines.

SUMMARY

Exemplary embodiments of the disclosure as described herein generally include systems and methods for transferring samples across machines so that a failure can be detected on a machine that has never seen this failure before. Embodiments of the invention apply transformations to failure samples, but use the fact that sufficient normal training data are usually available from different machines. Therefore, it is possible to model the probabilistic distribution of data for different machines. Based on this, according to embodiments of the invention, the data distribution from the source should be similar to the target after the transformation. Algorithms according to embodiments of the invention can obtain more realistic results, as shown in FIG. 1(d), where the failure samples are transferred in the machine 2 domain and may be more easily distinguished from the normal training samples.

According to an embodiment of the invention, there is provided a method for predicting failure modes in a machine, including learning a multivariate Gaussian distribution for each of a source machine and a target machine from data samples from one or more independent sensors of the source machine and the target machine, where the data samples are acquired under normal operating conditions for each machine, learning a multivariate Gaussian conditional distribution for each of the source machine and the target machine from data samples from one or more dependent sensors of the source machine and the target machine using the multivariate Gaussian distribution for the independent sensors, where the data samples are acquired under normal operating conditions for each machine, transforming data samples for the independent sensors from the source machine to the target machine using the multivariate Gaussian distributions for the source machine and the target machine, and transforming data samples for the dependent sensors from the source machine to the target machine using the transformed independent sensor data samples and the conditional Gaussian distributions for the source machine and the target machine.

According to a further embodiment of the invention, the method includes acquiring data samples from the independent sensors of the source machine associated with a failure, transforming the failure data samples for the independent sensors from the source machine to the target machine using the multivariate Gaussian distributions for the source machine and the target machine, and transforming the failure data samples for the dependent sensors from the source machine to the target machine using the transformed independent sensor data samples and the conditional Gaussian distributions for the source machine and the target machine.

According to a further embodiment of the invention, the multivariate Gaussian conditional distribution is expressed as $y_i | x_i \sim N(f_i(x_i), C_{y_i}(x_i))$, where $y_i$ represents a dependent sensor, $x_i$ represents an independent sensor, $f_i(x_1)$ represents a mean of the multivariate Gaussian conditional distribution of independent sensor $x_i$, and $C_{y_i}(x_i)$ represents a conditional covariance of dependent sensor $y_i$ given independent sensor $x_i$.

According to a further embodiment of the invention, the conditional covariance $C_{y_i}(x_i)$ is a diagonal matrix.

According to a further embodiment of the invention, the conditional covariance $C_{y_i}(x_i)$ is a constant.

According to a further embodiment of the invention, the transformation of independent sensor data samples from the source machine to the target machine is expressed by $x_{12} = C_{x_2}^{1/2} C_{x_1}^{-1/2}(x_1 - m_{x_1}) + m_{x_2}$, where $x_1$ represents independent sensor data for the source machine, $m_{x_1}$ is a mean of the multivariate Gaussian distribution of an independent sensor of the source machine, $m_{x_2}$ is a mean of the multivariate Gaussian distribution of an independent sensor of the target machine, $C_{x_1}$ is a covariance of the multivariate Gaussian distribution of an independent sensor of the source machine, and $C_{x_2}$ is a covariance of the multivariate Gaussian distribution of an independent sensor of the target machine.

According to a further embodiment of the invention, the transformation of dependent sensor data samples from the source machine to the target machine is expressed by $y_{12} = C_{y_2}^{1/2}(x_{12}) C_{y_1}^{-1/2}(x_1)(y_1 - f_1(x_1)) + f_2(x_{12})$, where $y_1$ represents dependent sensor data for the source machine, $y_2$ represents dependent sensor data for the target machine, $f_1(x_1)$ is the mean of the multivariate conditional distribution of an independent sensor of the source machine, $f_2(x_{12})$ is the mean of the multivariate conditional distribution of the transformed independent sensor for the target machine, $C_{y_1}(x_1)$ is a covariance of the multivariate Gaussian distribution of a dependent sensor $y_1$ given independent sensor $x_1$ for the source machine, and $C_{y_2}(x_{12})$ is a covariance of the multivariate Gaussian distribution of a dependent sensor $y_2$ of the target machine given the transformed independent sensor $x_{12}$.

According to a further embodiment of the invention, the mean of the multivariate conditional distribution for a given machine is a regression function that maps independent sensor data for the given machine to dependent sensor data for the given machine, where the given machine is one of the source machine and the target machine.

According to a further embodiment of the invention, the method includes receiving sensor data samples for each of a source machine and a target machine, and partitioning sensor data samples for each machine into data from independent sensors, and data from dependent sensors that depend on data values of the independent sensors.

According to another embodiment of the invention, there is provided a method for predicting failure modes in a machine, including receiving sensor data samples for each of a source machine and a target machine, and partitioning sensor data samples for each machine into data from one or more independent sensors, and data from one or more dependent sensors whose sensor values depend on data values of the independent sensors, where the data samples are acquired under normal operating conditions for each machine, transforming data samples for the independent sensors from the source machine to the target machine using a multivariate Gaussian distribution for the source machine and a multivariate Gaussian distribution for the target machine, transforming data samples for the dependent sensors from the source machine to the target machine using the transformed independent sensor data samples and a conditional Gaussian distribution for the source machine and a conditional Gaussian distribution for the target machine, acquiring data samples from the independent sensors of the source machine associated with a failure, transforming the failure data samples for the independent sensors from the source machine to the target machine using the multivariate Gaussian distributions for the source machine and the target machine, and transforming the failure data samples for the dependent sensors from the source machine to the target machine using the transformed independent sensor data samples and the conditional Gaussian distributions for the source machine and the target machine.

According to a further embodiment of the invention, the method includes learning the multivariate Gaussian distributions for the source machine and the target machine from the data samples from the independent sensors of the source machine and the target machine, and learning the multivariate Gaussian conditional distributions for the source machine and the target machine from the data samples from the dependent sensors of the source machine and the target machine using the multivariate Gaussian distribution for the independent sensors.

According to another embodiment of the invention, there is provided a non-transitory program storage device readable by a computer, tangibly embodying a program of instructions executed by the computer to perform the method steps for predicting failure modes in a machine.

DETAILED DESCRIPTION OF EXEMPLARY EMBODIMENTS

Figure 1:
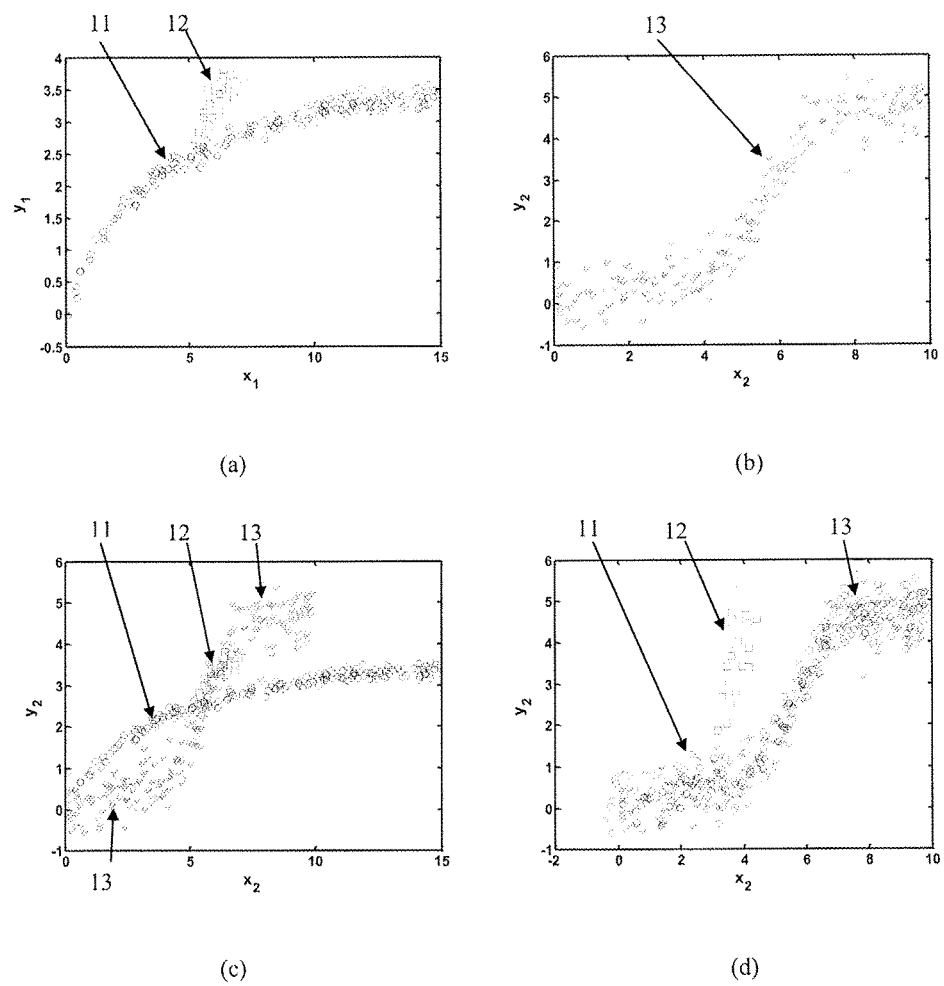
FIGS. 1(a)-(d) depict examples of transferring failure samples, according to embodiments of the disclosure.

Exemplary embodiments of the disclosure as described herein generally include methods for transforming failure samples across machines. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

Notation.

Suppose that there are K machines. Let $z_i$ denote the N-dimensional multivariate sensor values for machine i, where i=1, 2, ..., K, and let machine 1 always represents the source domain. This disclosure will focus on the K=2 case, in which samples are transferred from machine 1 to machine 2. If there are more than 2 machines, the same process can be repeated between machine 1 and machine 3, between machine 1 and machine 4, etc.

Embodiments of the invention may find a transformation $z_{12} = g_{12}(z_1)$ such that the distribution of $z_{12}$ is the same as the distribution of $z_2$ in the target domain. Here, the variable z represents all sensors, both independent and dependent. One straightforward solution is to assume a single multivariate Gaussian distribution for each of $z_1$ and $z_2$, such that $z_1 \sim N(m_1, C_1)$ and $z_2 \sim N(m_2, C_2)$, where m and C denote the mean and covariance of a Gaussian distribution, respectively. It can be proved that the best linear transformation has a form of $$z_{12}=g_{12}(z_1)=C_2^{1/2}RC_1^{-1/2}(z_1-m_1)+m_2. \quad (1)$$

In EQ. (1), R is an arbitrary orthogonal matrix that can be set to the identity matrix and thus removed from the equation. The assumption of a Gaussian distribution is usually not valid in machine condition monitoring because of the complexity and multiple-mode nature of a machine. As shown in FIGS. 1(a)-(d), the distribution of data is far from an ideal Gaussian distribution.

According to embodiments of the disclosure, the data distribution of a machine can be modeled using conditional models. This is based on an idea from U.S. Pat. No. 7,305,317, assigned to the assignee of the present disclosure, the contents of which are herein incorporated by reference in their entirety: all sensors can be categorized into independent sensors and dependent sensors. For independent sensors, the joint distribution may be described by a multivariate Gaussian distribution. For the dependent sensors, the conditional distribution given the independent sensors can be modeled by regression models. By using a conditional model, the complicated and often multiple-mode data distribution, typical in machine condition monitoring, can be modeled better than a single multivariate Gaussian distribution.

During a sample transformation stage, the independent sensors from may be transformed from the source machine to the target machine. Then the dependent sensors can be transformed based on the already transformed independent sensors and the conditional models from both machines.

As disclosed above, all sensors may be partitioned into two categories: independent sensors and dependent sensors. The dependent sensor data rely on the values of independent sensors and the independent sensors have little correlation between each other. For example, in a gas turbine, the gas flow and inlet temperature sensors are independent, since each of these sensors can vary without being affected by the other sensor. On the other hand, the power sensor or a blade path temperature sensor is a dependent sensor, as its value can be predicted from a set of independent sensors. The partition of independent and dependent sensors requires domain knowledge or can be performed using correlation analysis. However, there is no disclosure in U.S. Pat. No. 7,305,317 of modeling the probabilistic distribution of independent and dependent sensors.

Suppose there are K machines. Let the original sensor vector $z_i=[x_i^T y_i^T]^T$, where i=1, 2, ..., K. $x_i$ denotes the M independent sensors and $y_i$ denotes the L dependent sensors, both being column vectors. According to an embodiment of the disclosure, the distribution of independent sensors $x_i$ may be modeled as a multivariate Gaussian distribution:

$$x_i \sim N(m_{x_i}, C_{x_i}). \quad (2)$$

According to an embodiment of the invention, it may be assumed that the covariance $C_{x_i}$ is diagonal because $x_i$ contains independent sensors with little correlation between each pair of them. Both the mean $m_{x_i}$ and covariance $C_{x_i}$ are learned from normal training samples. This may be done separately for all machines.

According to an embodiment of the invention, the conditional distribution of dependent sensors $y_i$ given independent sensors $x_i$ may be modeled as another multivariate Gaussian distribution.

$$y_i|x_i \sim N(f_i(x_i), C_{y_i}(x_i)). \quad (3)$$

Figure 2:
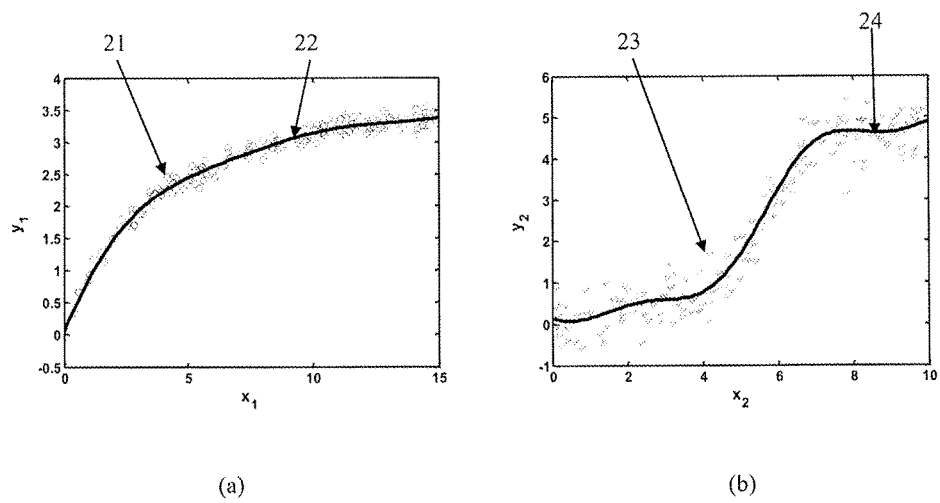
FIGS. 2(a)-(b) depict the learned regression functions using a Gaussian process for two machines, according to embodiments of the disclosure.

In EQ. (3), $f_i(x_i)$, the mean of the conditional Gaussian distribution, is a regression function that maps the independent sensors $x_i$ to the dependent sensors $y_i$. According to embodiments of the disclosure, $f_i(x_i)$ may be learned from normal training samples for machine i. Any appropriate linear or nonlinear regression functions may be used for $f_i(x_i)$. Typical choices of $f_i(x_1)$ can be a support vector regression and a Gaussian process. According to an embodiment of the disclosure, it may be assumed that the conditional covariance $C_{y_i}(x_i)$ is diagonal. Note that $C_{y_i}(x_i)$ is a function that depends on the independent sensors $x_i$. But for simplicity, according to embodiments of the disclosure, it may also be assumed for the remainder of this disclosure that $C_{y_i}$ is constant. FIGS. 2(a)-(b) depict the training samples 21, 23 and learned regression functions $f_i(x_1)$ 22 and 24 using a Gaussian process for machine 1 in FIG. 2(a) and machine 2 in FIG. 2(b).

According to an embodiment of the invention, to transform samples from machine 1 to machine 2, the independent sensors $x_1$ may be transformed based on the Gaussian model as follows:

$$x_{12}=g_{x_{12}}(x_1)=C_{x_2}^{1/2}C_{x_1}^{-1/2}(x_1-m_{x_1})+m_{x_2} \quad (4)$$

EQ. (4) is similar to EQ. (1) except that only the independent sensors are transformed instead of all sensors. Because $C_{x_i}$ is diagonal, EQ. (4) can be viewed as a normalization from machine 1 followed by a de-normalization in machine 2.

According to an embodiment of the invention, the dependent sensors $y_1$ can be transformed based on the conditional model as $$y_{12}=g_{y_{12}}(x_1,y_1)=C_{y_2}^{1/2}(x_{12})C_{y_1}^{-1/2}(x_1)(y_1-f_1(x_1))+f_2(x_{12}) \quad (5)$$

where the transformed independent sensors $x_{12}$ are obtained from EQ. (4), and $f_i(x_i)$ is the regression function that is the mean of the conditional Gaussian distribution.

Figure 3:
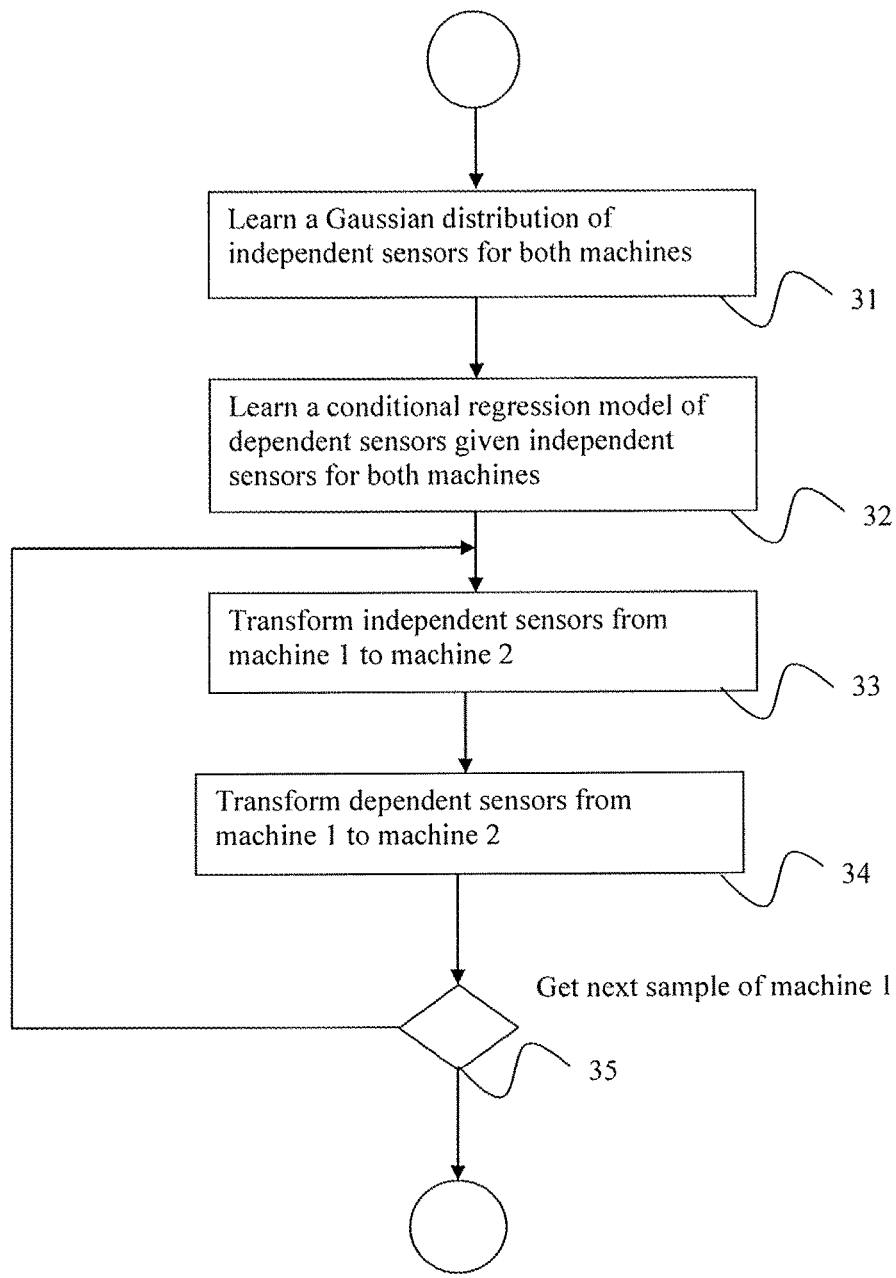
FIG. 3 is a flow chart of a work flow for obtaining the transformation and then transform samples, according to an embodiment of the invention.

FIG. 3 is a flow chart of a method for predicting failure modes for a machine by obtaining the transformation and transforming the samples, according to an embodiment of the invention. Referring now to the figure, a method begins at step 31 by learning a multivariate Gaussian distribution, as expressed by EQ. (2), for the independent sensors for both machines. At step 32, the conditional distribution of dependent sensors $y_i$ given independent sensors $x_i$ are modeled as another multivariate Gaussian distribution, as expressed by EQ. (3). Steps 33 to 35 are a loop in which samples are transformed from machine 1 to machine 2. At step 33, samples for the independent sensors are transformed from machine 1 to machine 2 using EQ. (4), and at step 34, samples for the dependent sensors are transformed from machine 1 to machine 2 using EQ. (5). Steps 33 and 34 are repeated from step 35 for the remaining samples of machine 1.

Figure 4:
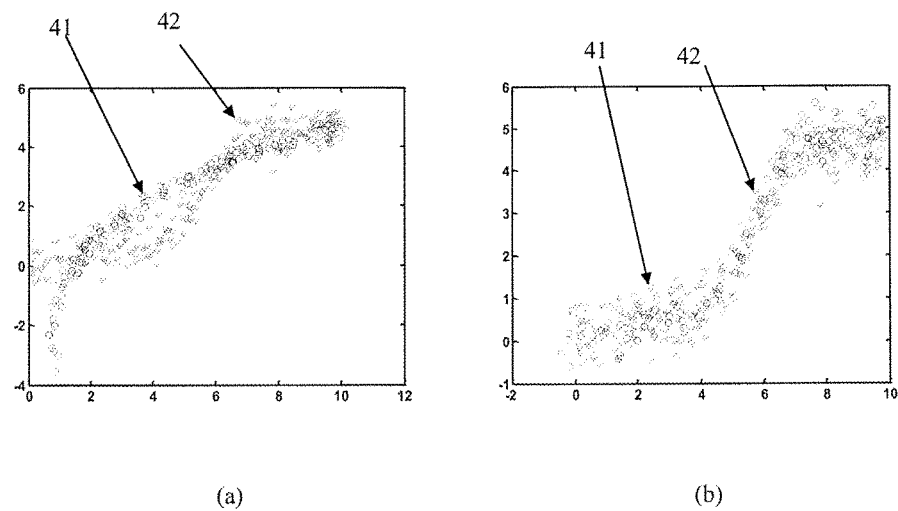
FIGS. 4(a)-(b) shows the comparison results of transformation of normal training samples using a single multivariate Gaussian distribution and a conditional model according to an embodiment of the invention.

FIGS. 4(a)-(b) shows results of comparing unchanged normal training samples 42 of machine 2 with transformed normal training samples 41 for machine 1 using a single multivariate Gaussian distribution in FIG. 4(a) and a conditional model according to an embodiment of the invention in FIG. 4(b). For illustration purpose, only 2D data are shown (N=2, M=1 and L=1). As shown in FIG. 4(b), after transformation, the distribution of transformed machine 1 samples 41 using a method according to an embodiment of the invention is much closer to the machine 2 samples 42 than using the single Gaussian distribution model, shown in FIG. 4(a).

Using the same transformation, the failure training samples of machine 1 may also be transformed to machine 2 as shown in FIG. 1(d). Then a pattern recognition algorithm as is known in the art can be applied to distinguish between normal and failure samples for machine 2.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
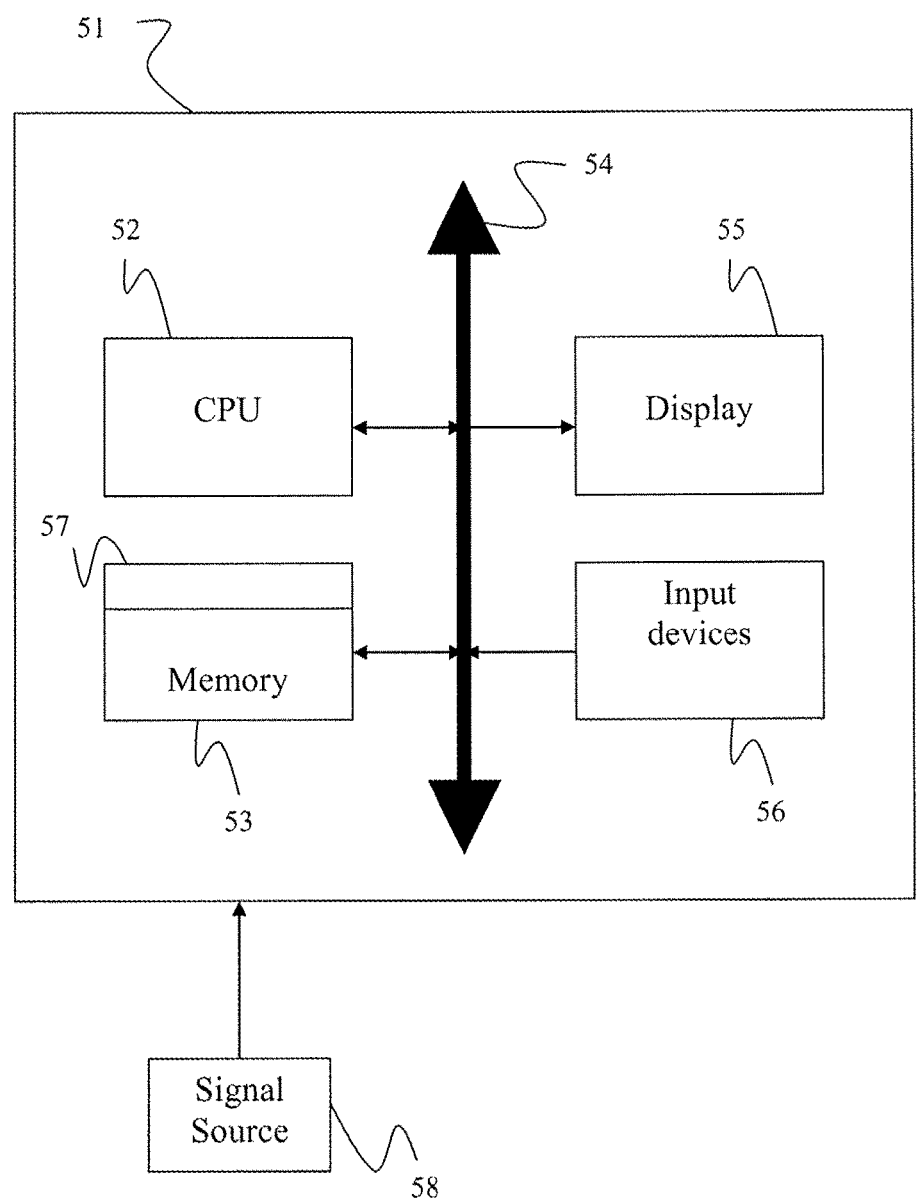
FIG. 5 is a block diagram of an exemplary computer system for implementing a method for transforming failure samples across machines, according to an embodiment of the disclosure.

FIG. 5 is a block diagram of an exemplary computer system for implementing a method for transforming failure samples across machines, according to an embodiment of the invention. Referring now to FIG. 5, a computer system 51 for implementing the present invention can comprise, inter alia, a central processing unit (CPU) 52, a memory 53 and an input/output (I/O) interface 54. The computer system 51 is generally coupled through the I/O interface 54 to a display 55 and various input devices 56 such as a mouse and a keyboard. The support circuits can include circuits such as cache, power supplies, clock circuits, and a communication bus. The memory 53 can include random access memory (RAM), read only memory (ROM), disk drive, tape drive, etc., or a combinations thereof. The present invention can be implemented as a routine 57 that is stored in memory 53 and executed by the CPU 52 to process the signal from the signal source 58. As such, the computer system 51 is a general purpose computer system that becomes a specific purpose computer system when executing the routine 57 of the present invention.

The computer system 51 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A computer-implemented method for predicting failure modes in a machine, the method implemented by the computer comprising:

learning a multivariate Gaussian distribution for each of a source machine and a target machine from data samples from one or more independent sensors of the source machine and the target machine, wherein said data samples are acquired under normal operating conditions for each machine;

learning a multivariate Gaussian conditional distribution for each of the source machine and the target machine from data samples from one or more dependent sensors of said source machine and said target machine using the multivariate Gaussian distribution for the independent sensors, wherein said data samples are acquired under normal operating conditions for each machine;

transforming data samples for the independent sensors from the source machine to the target machine using the multivariate Gaussian distributions for the source machine and the target machine;

transforming data samples for the dependent sensors from the source machine to the target machine using the transformed independent sensor data samples and the conditional Gaussian distributions for the source machine and the target machine, acquiring data samples from the independent sensors of the source machine associated with a failure;

transforming said failure data samples for the independent sensors from the source machine to the target machine using the multivariate Gaussian distributions for the source machine and the target machine; and transforming said failure data samples for the dependent sensors from the source machine to the target machine using the transformed independent sensor data samples and the conditional Gaussian distributions for the source machine and the target machine.

2. The method of claim 1, wherein the multivariate Gaussian conditional distribution is expressed as $y_i|x_i \sim N(f_i(x_i), C_{y_i}(x_i))$, where $y_i$ represents a dependent sensor, $x_i$ represents an independent sensor, $f_i(x_1)$ represents a mean of the multivariate Gaussian conditional distribution of independent sensor $x_i$, and $C_{y_i}(x_i)$ represents a conditional covariance of dependent sensor $y_i$ given independent sensor $x_i$.

3. The method of claim 2, wherein the conditional covariance $C_{y_i}(x_i)$ is a diagonal matrix.

4. The method of claim 3, wherein the conditional covariance $C_{y_i}(x_i)$ is a constant.

5. The method of claim 2, wherein the transformation of independent sensor data samples from the source machine to the target machine is expressed by $$x_{12} = C_{x_2}^{1/2} C_{x_1}^{-1/2} (x_1 - m_{x_1}) + m_{x_2},$$

wherein $x_1$ represents independent sensor data for the source machine, $m_{x_1}$ is a mean of the multivariate Gaussian distribution of an independent sensor of the source machine, $m_{x_2}$ is a mean of the multivariate Gaussian distribution of an independent sensor of the target machine, $C_{x_1}$ is a covariance of the multivariate Gaussian distribution of an independent sensor of the source machine, and $C_{x_2}$ is a covariance of the multivariate Gaussian distribution of an independent sensor of the target machine.

6. The method of claim 5, wherein the transformation of dependent sensor data samples from the source machine to the target machine is expressed by $$y_{12} = C_{y_2}^{1/2}(x_{12}) C_{y_1}^{-1/2}(x_1)(y_1 - f_1(x_1)) + f_2(x_{12}), \text{ wherein}$$

$y_1$ represents dependent sensor data for the source machine, $y_2$ represents dependent sensor data for the target machine, $f_1(x_1)$ is the mean of the multivariate conditional distribution of an independent sensor of the source machine, $f_2(x_{12})$ is the mean of the multivariate conditional distribution of the transformed independent sensor for the target machine, $C_{y_1}(x_1)$ is a covariance of the multivariate Gaussian distribution of a dependent sensor $y_1$ given independent sensor $x_1$ for the source machine, and $C_{y_2}(x_{12})$ is a covariance of the multivariate Gaussian distribution of a dependent sensor $y_2$ of the target machine given the transformed independent sensor $x_{12}$.

7. The method of claim 6, wherein the mean of the multivariate conditional distribution for a given machine is a regression function that maps independent sensor data for the given machine to dependent sensor data for the given machine, wherein the given machine is one of the source machine and the target machine.

8. The method of claim 1, further comprising receiving sensor data samples for each of a source machine and a target machine, and partitioning sensor data samples for each machine into data from independent sensors, and data from dependent sensors that depend on data values of the independent sensors.

9. The method of claim 1, further comprising:
learning the multivariate Gaussian distributions for the source machine and the target machine from the data samples from the independent sensors of the source machine and the target machine; and
learning the multivariate Gaussian conditional distributions for the source machine and the target machine from the data samples from the dependent sensors of said source machine and said target machine using the multivariate Gaussian distribution for the independent sensors.

10. A computer-implemented method for predicting failure modes in a machine, the method implemented by the computer comprising:
receiving sensor data samples for each of a source machine and a target machine, and partitioning sensor data samples for each machine into data from one or more independent sensors, and data from one or more dependent sensors whose sensor values depend on data values of the independent sensors, wherein said data samples are acquired under normal operating conditions for each machine;
transforming data samples for the independent sensors from the source machine to the target machine using a multivariate Gaussian distribution for the source machine and a multivariate Gaussian distribution for the target machine;
transforming data samples for the dependent sensors from the source machine to the target machine using the transformed independent sensor data samples and a conditional Gaussian distribution for the source machine and a conditional Gaussian distribution for the target machine;
acquiring data samples from the independent sensors of the source machine associated with a failure;
transforming said failure data samples for the independent sensors from the source machine to the target machine using the multivariate Gaussian distributions for the source machine and the target machine; and
transforming said failure data samples for the dependent sensors from the source machine to the target machine using the transformed independent sensor data samples and the conditional Gaussian distributions for the source machine and the target machine.

11. A non-transitory program storage device readable by a computer, tangibly embodying a program of instructions executed by the computer to perform the method steps for predicting failure modes in a machine, the method comprising:
learning a multivariate Gaussian distribution for each of a source machine and a target machine from data samples from one or more independent sensors of the source machine and the target machine, wherein said data samples are acquired under normal operating conditions for each machine;
learning a multivariate Gaussian conditional distribution for each of the source machine and the target machine from data samples from one or more dependent sensors of said source machine and said target machine using the multivariate Gaussian distribution for the independent sensors, wherein said data samples are acquired under normal operating conditions for each machine;
transforming data samples for the independent sensors from the source machine to the target machine using the multivariate Gaussian distributions for the source machine and the target machine;
transforming data samples for the dependent sensors from the source machine to the target machine using the transformed independent sensor data samples and the conditional Gaussian distributions for the source machine and the target machine,
acquiring data samples from the independent sensors of the source machine associated with a failure;
transforming said failure data samples for the independent sensors from the source machine to the target machine using the multivariate Gaussian distributions for the source machine and the target machine; and
transforming said failure data samples for the dependent sensors from the source machine to the target machine using the transformed independent sensor data samples and the conditional Gaussian distributions for the source machine and the target machine.

12. The computer readable program storage device of claim 11, wherein the multivariate Gaussian conditional distribution is expressed as $y_i|x_i \sim N(f_i(x_i), C_{y_i}(x_i))$, where $y_i$ represents a dependent sensor, $x_i$ represents an independent sensor, $f_i(x_1)$ represents a mean of the multivariate Gaussian conditional distribution of independent sensor $x_i$, and $C_{y_i}(x_i)$ represents a conditional covariance of dependent sensor $y_i$ given independent sensor $x_i$.

13. The computer readable program storage device of claim 12, wherein the conditional covariance $C_{y_i}(x_i)$ is a diagonal matrix.

14. The computer readable program storage device of claim 13, wherein the conditional covariance $C_{y_i}(x_i)$ is a constant.

15. The computer readable program storage device of claim 12, wherein the transformation of independent sensor data samples from the source machine to the target machine is expressed by $$x_{12} = C_{x_2}^{1/2} C_{x_1}^{-1/2}(x_1 - m_{x_1}) + m_{x_2},$$

wherein $x_1$ represents independent sensor data for the source machine, $m_{x_1}$ is a mean of the multivariate Gaussian distribution of an independent sensor of the source machine, $m_{x_2}$ is a mean of the multivariate Gaussian distribution of an independent sensor of the target machine, $C_{x_1}$ is a covariance of the multivariate Gaussian distribution of an independent sensor of the source machine, and $C_{x_2}$ is a covariance of the multivariate Gaussian distribution of an independent sensor of the target machine.

16. The computer readable program storage device of claim 15, wherein the transformation of dependent sensor data samples from the source machine to the target machine is expressed by $$y_{12} = C_{y_2}^{1/2}(x_{12}) C_{y_1}^{-1/2}(x_1)(y_1 - f_1(x_1)) + f_2(x_{12}), \text{ wherein}$$

$y_1$ represents dependent sensor data for the source machine, $y_2$ represents dependent sensor data for the target machine, $f_1(x_1)$ is the mean of the multivariate conditional distribution of an independent sensor of the source machine, $f_2(x_{12})$ is the mean of the multivariate conditional distribution of the transformed independent sensor for the target machine, $C_{y_1}(x_1)$ is a covariance of the multivariate Gaussian distribution of a dependent sensor $y_1$ given independent sensor $x_1$ for the source machine, and $C_{y_2}(x_{12})$ is a covariance of the multivariate Gaussian distribution of a dependent sensor $y_2$ of the target machine given the transformed independent sensor $x_{12}$.

17. The computer readable program storage device of claim 16, wherein the mean of the multivariate conditional distribution for a given machine is a regression function that maps independent sensor data for the given machine to dependent sensor data for the given machine, wherein the given machine is one of the source machine and the target machine.

18. The computer readable program storage device of claim 11, the method further comprising receiving sensor data samples for each of a source machine and a target machine, and partitioning sensor data samples for each machine into data from independent sensors, and data from dependent sensors that depend on data values of the independent sensors.

* * * * *